No. 12,715. REISSUED NOV. 5, 1907.
J. R. DAWKINS.
ELECTRICAL ATTACHMENT FOR MOVABLE OBJECTS.
APPLICATION FILED SEPT. 30, 1907.
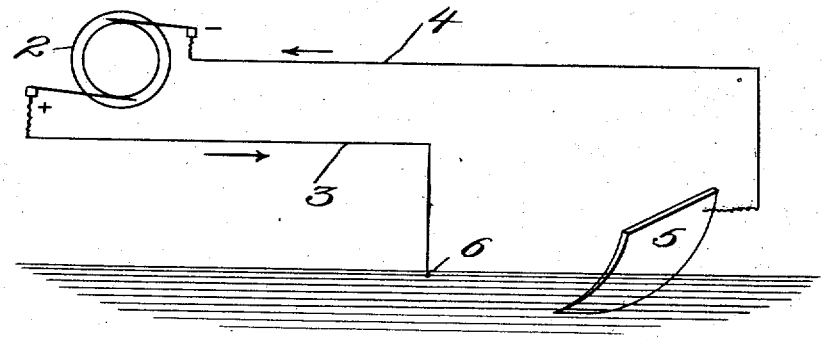
Witnesses:
C. D. Kesler
W. B. Kesler
Inventor
John R. Dawkins
By
James L. Norris
Atty.

UNITED STATES PATENT OFFICE.

JOHN R. DAWKINS, OF DALLAS, TEXAS.

ELECTRICAL ATTACHMENT FOR MOVABLE OBJECTS.

No. 12,715. Specification of Reissued Letters Patent. Reissued Nov. 5, 1907.

Original No. 855,389, dated May 28, 1907, Serial No. 301,885. Application for reissue filed September 30, 1907. Serial No. 395,321.

*To all whom it may concern:*

Be it known that I, JOHN R. DAWKINS, a citizen of the United States, residing at Dallas, in the county of Dallas and State of Texas, have invented new and useful Improvements in Electrical Attachments for Movable Objects, of which the following is a specification.

This invention relates to a means to prevent the retarding of a movable element, such as shovel or disk plows, road rollers and rotatable and reciprocatory devices, when the said element is traveling through or upon an adhering earthy electrical conducting substance, and the object thereof is to provide an electrical attachment in a manner as hereinafter set forth, and so set up with respect to the element to prevent, during the travel or moving of the said element, the adhering of the substance thereto so that the travel or operation of the element will not be in any way retarded by the adhering thereto of said substance.

For the purpose of illustration I have shown the traveling element by way of example as a ground working device in the form of a shovel plow of ordinary construction, the said plow being partly embedded in the adhering earthy substance and in electrical connection with a source of electrical energy with which communicates a positive and a negative conducting means, the former having contact with the earthy substance and the latter leading to and connected with the plow, thereby causing the current from the electrical source to flow through the positive conductor, through the medium of the earthy substance to the plow, and then completing the circuit by the negative conducting means between the plow and the source of electrical energy. By directing the current to flow in the manner as stated, it causes the earthy substance to become non-adherent so as to prevent the substance from adhering to the plow which otherwise would retard the travel of the latter. However I desire it to be understood that the illustration accompanying this specification is shown by way of example and for the purpose of obtaining a clear understanding of the invention, as the attachment, as will be hereinafter described, may be set up in operative relation with respect to other devices or machines than a shovel plow, and it will furthermore be understood that I may resort to any arrangement, modification or variation which will come within the scope of the claims hereunto appended without departing from the spirit of the invention.

The drawing illustrates a diagrammatic view of an attachment in accordance with this invention, showing the adaptation thereof in connection with a shovel plow.

In the drawing, the reference character 2 designates a source of electrical energy, as shown, an electrical generator. Leading therefrom is a positive conducting means 3 and leading thereto is a negative conducting means 4. The conducting means may be of any suitable arrangement and attached to the generator 2 in any desirable manner. The positive conducting means 3 has contact with the soil or earthy substance while the negative conducting means 4 is connected with the plow 5. By such an arrangement the current flows through the positive conducting means 3, thence through the earthy substance through the plow 5 and then over the negative conducting means 4 to the generator 2. By completing the current in the manner as stated, the current will be continuous through the element and so act as to cause the earthy substance with which the element contacts to become non-adherent and prevent the same from adhering to the element during the travel thereof. The grounding of the positive wire, as indicated by the reference character 6, may be had in any convenient manner.

What I claim is—

1. In combination, a ground-working device, an electrical source, a positive conductor communicating with said source and grounded, and a negative conductor communicating with the electrical source and electrically connected to the ground-working device.

2. The combination with a movable element contacting with an adhering earthy electrical conducting substance, of a source of electrical energy, a negative electrical conducting means connecting said source and said element, and a positive electrical conducting means connecting said source and said substance at a point removed from said element, whereby an electrical circuit is completed to prevent the adhering of the said substance to said element.

3. In combination, a ground-working device, a source of electrical energy, an electrical connection between said source and said device, and electrical connections between said source and the ground thereby completing an electrical circuit to prevent the adhering of earthy substances to said device.

In testimony whereof, I have hereunto set my hand in presence of two subscribing witnesses.

JOHN R. DAWKINS.

Witnesses:
N. LOUIS BOGAN,
CHAS. S. HAYER.